(12) United States Patent
Satish

(10) Patent No.: US 8,250,085 B1
(45) Date of Patent: Aug. 21, 2012

(54) METHOD TO IMPROVE DATA LOSS PREVENTION VIA CROSS LEVERAGING FINGERPRINTS

(75) Inventor: Sourabh Satish, Fremont, CA (US)

(73) Assignee: Symantec Corporation, Mountain View, CA (US)

(*) Notice: Subject to any disclaimer, the term of this patent is extended or adjusted under 35 U.S.C. 154(b) by 154 days.

(21) Appl. No.: 12/338,943

(22) Filed: Dec. 18, 2008

(51) Int. Cl.
*G06F 7/00* (2006.01)
(52) U.S. Cl. ........................................ 707/758
(58) Field of Classification Search ............... 707/999.2, 707/758
See application file for complete search history.

(56) References Cited

U.S. PATENT DOCUMENTS

| | | | |
|---|---|---|---|
| 2004/0163106 A1* | 8/2004 | Schrempp et al. | 725/31 |
| 2006/0130125 A1* | 6/2006 | Beiter et al. | 726/4 |
| 2008/0154730 A1* | 6/2008 | Schmelzer et al. | 705/14 |
| 2009/0232300 A1* | 9/2009 | Zucker et al. | 380/2 |

* cited by examiner

*Primary Examiner* — Jensen Hu
(74) *Attorney, Agent, or Firm* — Lowenstein Sandler PC

(57) ABSTRACT

A method and system for improving data loss prevention via cross leveraging fingerprints of protected data is described. In one embodiment, fingerprints of sensitive data of multiple organizations are shared across data loss prevention (DLP) systems of these organizations. A DLP system of each organization monitors information content associated with this organization to detect sensitive data of other organizations, and notifies one or more users within the organization upon detecting sensitive data of other organizations. In addition, a report of external data loss detection is provided to users within an organization whose sensitive data is detected in information content of the other organizations.

18 Claims, 6 Drawing Sheets

METHOD TO IMPROVE DATA LOSS PREVENTION VIA CROSS LEVERAGING FINGERPRINTS

FIELD OF INVENTION

Embodiments of the invention relate to the field of data loss prevention, and more particularly, to improving data loss prevention via cross leveraging fingerprints of protected data.

BACKGROUND OF THE INVENTION

A modern organization typically maintains a data storage system to store and deliver sensitive information concerning various significant business aspects of the organization. Sensitive information may include data on customers (or patients), contracts, deliveries, supplies, employees, manufacturing, or the like. In addition, sensitive information may include intellectual property (IP) of an organization such as software code developed by employees of the organization, documents describing inventions conceived by employees of the organization, etc. In today's global marketplace environment, employees often change their place of employment and may end up moving to a competitor of their former employer. If a new employee possesses knowledge of IP of his or her former employer, this may become a matter of concern for both the former employer and the present employer. For example, if the two competitors are software companies, the former employer has the risk of losing software code developed by a former employee, and the current employer has the risk of being unknowingly liable for IP infringement if the new employee uses the software code developed at the former employer.

Existing security techniques fail to provide efficient solutions that can protect organizations in the situations described above.

SUMMARY OF THE INVENTION

A method and system for improving data loss prevention via cross leveraging fingerprints of protected data is described. In one embodiment, fingerprints of sensitive data of multiple organizations are shared across data loss prevention (DLP) systems of these organizations. A DLP system of each organization monitors information content associated with this organization to detect sensitive data of other organizations, and notifies one or more users within the organization upon detecting sensitive data of other organizations. In addition, a report of external data loss detection is provided to users within an organization whose sensitive data is detected in information content of the other organizations.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
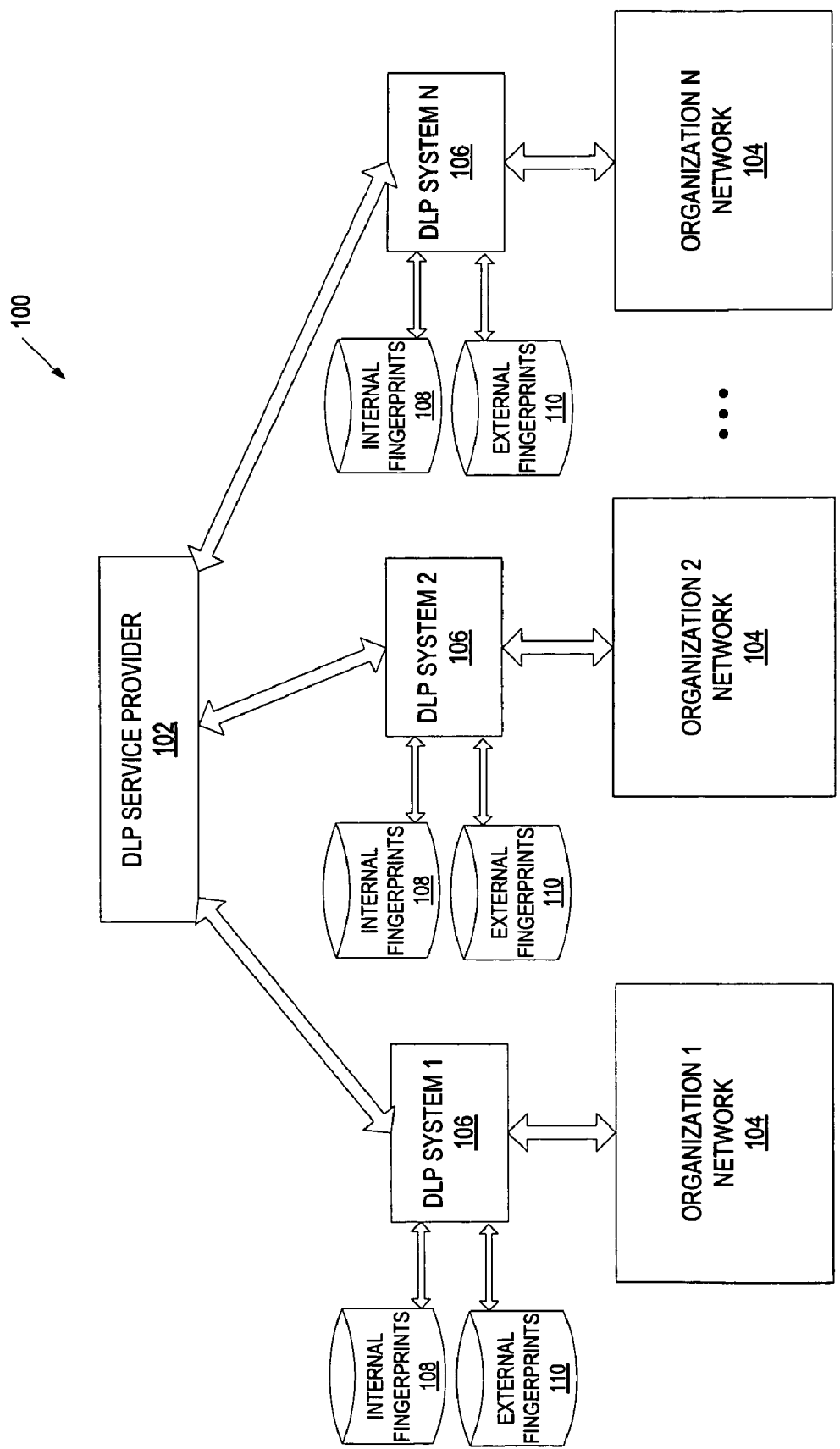
FIG. 1 is a block diagram of exemplary system architecture in which embodiments of the present invention may operate.

A system and method for improving data loss prevention (DLP) via cross leveraging fingerprints of protected data is described. In one embodiment, a DLP service provider distributes fingerprints of sensitive data of multiple organizations across DLP systems of these organizations. Sensitive data may include personal information pertaining to employees of an organization, personal information pertaining to customers of the organization, information pertaining to business process of the organization, information pertaining to intellectual property (IP) of the organization, etc. A DLP system of each organization monitors information content associated with this organization to detect sensitive data of other organizations ("external sensitive data"), and notifies a user (e.g., a system administrator) about the detection of the external sensitive data. In addition, the DLP system of each organization sends information regarding the detection of external sensitive data to the DLP service provider. Based on this information, the DLP service provider informs each organization about the detection of their sensitive data at the sites of other organizations.

As a result, the DLP service provider allows to detect leakage of sensitive data of an organization by virtue of finding this sensitive data at some other organization's site. In addition, the DLP service provider informs the other organization of the presence of external sensitive data at its site, thus making the other organization aware of potential liability associated with such a presence (e.g., potential liability for IP infringement if a new employee uses software code developed at his or her former employer).

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

FIG. 1 is a block diagram of exemplary system architecture 100 in which embodiments of the present invention may operate. System architecture 100 may include networks 104 of various organizations (e.g., enterprises, small businesses, etc.). Each organization has computers and storage devices coupled to each other via a network (e.g., local area network (LAN)). The computers and the storage devices may store sensitive data of the organization in the form of databases, files, libraries, web pages, etc. The sensitive data may include, for example, confidential employee information, confidential client or patient information, business process information, IP information (e.g., software code, invention disclosure information, etc.), etc.

Each network 104 has a DLP system 106 that may be part of network 104 or be coupled to the network 104. The DLP system 106 may be hosted by one or more machines including one or more server computers, client computers, gateways or any other computing devices. The DLP systems 106 are coupled to a DLP service provider 102 via a network (e.g., a public network such as Internet or a private network such as LAN). The DLP service provider 102 may include one or more servers or other computing devices communicating with the DLP systems 106 as will be discussed in more detail below.

The DLP system 106 scans information within the organization network 104 and electronic communications transferred from, and to, the organization network 104 to detect sensitive data that violates DLP policies. A DLP policy may specify conditions that trigger a violation based on regulations concerning handling of sensitive data maintained by an organization, or based on corporate data governance rules. These regulations may include, for example, the Health Insurance Portability and Accountability Act (HIPAA) ensuring the confidentiality of electronic protected health information, California Senate Bill 1 (SB1) or Senate Bill 1386 (SB1386) controlling customer information leaving the company and affiliates, the Gramm-Leach-Bliley Financial Services Modernization Act controlling customer information leaving a financial institution, the Cardholder Information Security Program (CISP) controlling handling of customer credit card information maintained by an organization, or the like.

The DLP system 106 performs the scanning using fingerprints of source data. A fingerprint includes an encrypted or hashed copy of the source data or some other representation of the source data that would not allow a malicious user to recover the actual content of the source data. The DLP system 106 may create fingerprints from sensitive data stored within the organization ("internal sensitive data") and store it in a data store 108 (e.g., a database, a repository, etc.).

When scanning information content stored within the network 104 and/or information content sent and/or received by the network 104, the DLP system 106 may determine that the information content includes sensitive data that violates a DLP policy. The DLP system 106 may then report the policy violation to a designated user (e.g., a system administrator, a supervisor of the sender or recipient, etc.), prevent the transfer of the information content violating the DLP policy, or perform some other action.

In one embodiment, the DLP service provider 102 allows the organizations to share fingerprints of their sensitive data. In particular, the DLP service provider 102 may distribute fingerprints of an organization to DLP systems of other organizations participating in the fingerprint sharing. The DLP system 106 of each other organization will then store these external fingerprints in a data store 110.

During monitoring, the DLP system 106 will scan information content using both the internal fingerprints 108 and the external fingerprints 110. Upon detecting the presence of external sensitive data in the information content being scanned, the DLP system 106 will notify a designated user (e.g., a system administrator) of this incident. In addition, the DLP system 106 will send information on the detection of external sensitive data to the DLP service provider 102.

The DLP service provider 102 will receive information on the detection of external sensitive data from various DLP systems 106 and will use this information to compile a report for each participating organization regarding this organization's sensitive data detected at the sites of other organizations. The DLP service provider 102 will then send the resulting reports to designated users within corresponding organizations.

Figure 2:
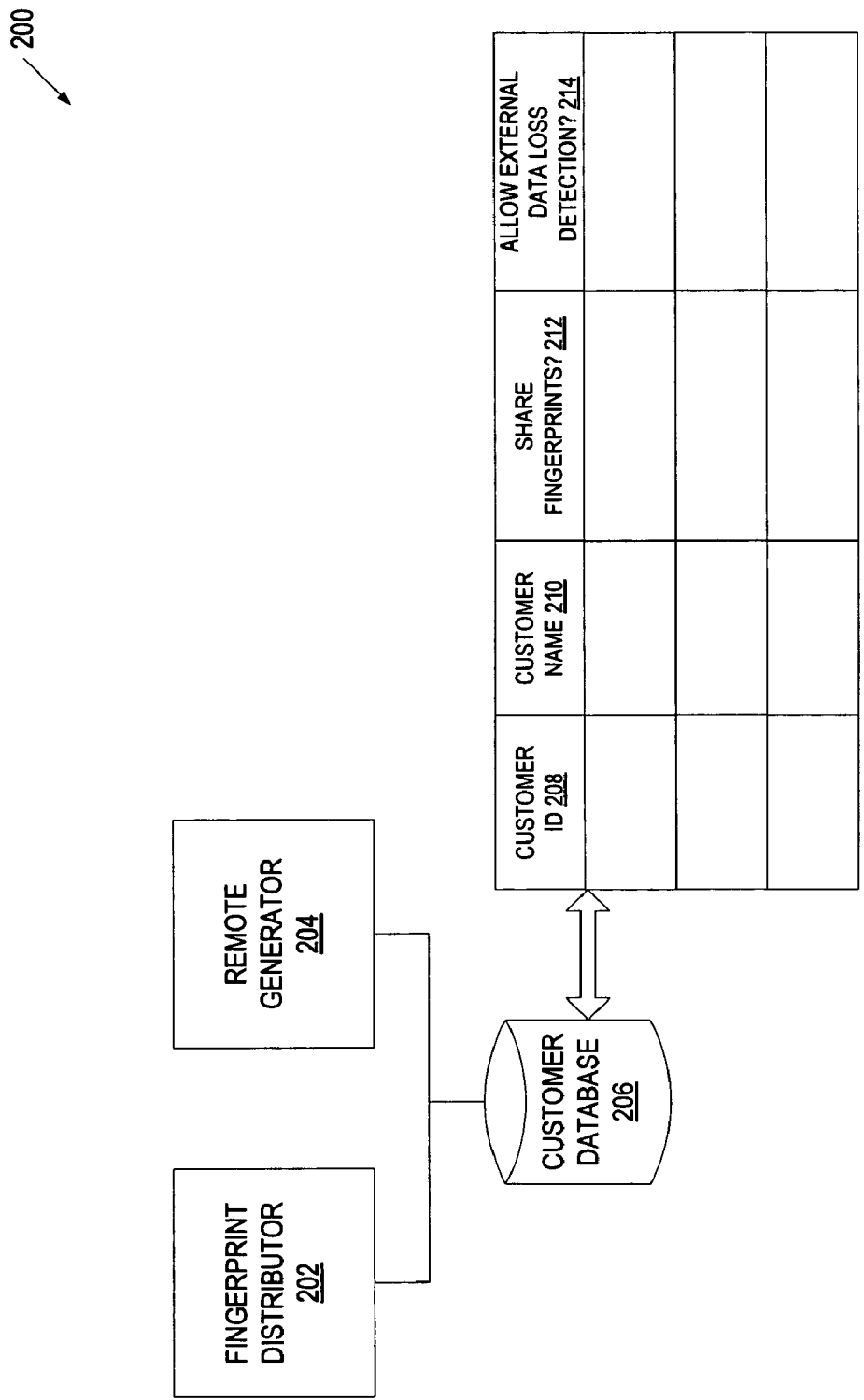
FIG. 2 is a block diagram of one embodiment of a data loss prevention (DLP) service provider.

FIG. 2 is a block diagram of one embodiment of a DLP service provider 200. The DLP service provider 200 may include a fingerprint distributor 202, a report generator 204, and a customer database 206.

The customer database 206 may include a list of organizations that have requested the fingerprint sharing feature of the DLP service. The fingerprint sharing feature allows an organization to publish fingerprints of its sensitive data at other organizations' sites, and to receive reports specifying the detection of its sensitive data at the other organizations' sites. In addition, the fingerprint sharing feature may allow an organization to host other organizations' fingerprints at its site, and to receive reports specifying the detection of the other organizations' sensitive data at its own site. In one embodiment, the DLP service provider 200 enables the fingerprint sharing feature only if the number of organizations that have requested this feature exceeds a predefined threshold.

For each organization requesting the fingerprint sharing feature, the customer database 206 may store the name 210 of the organization and a unique customer ID 208 assigned to the organization. In addition, the customer database 206 may specify whether the organization has agreed to sharing fingerprints (column 212) and to allowing the detection of external sensitive data (column 214). It should be noted that the format of the customer database 206 is shown in FIG. 2 for illustration only and is not intended to limit the scope of the present disclosure in any way.

The fingerprint distributor 202 is responsible for receiving a request from an organization (e.g., via a respective DLP system 106) to use the fingerprint sharing feature, automatically assigning a unique customer number to this organization, and storing this information in the customer database 206. In addition, the fingerprint distributor 202 may determine whether the request covers publishing of fingerprints at the DLP systems of other organizations. If so, the fingerprint distributor 202 obtains the fingerprints of the requesting organization, adds the customer number of the organization to the fingerprints, and distributes the fingerprints to the DLP systems of the other organizations. In one embodiment, the fingerprint distributor 202 also distributes DLP policies, defining detection of external sensitive data, to the DLP systems of the other organizations. Alternatively, the DLP policies are created by each DLP systems receiving the fingerprints of the external sensitive data.

Further, the fingerprint distributor 202 may determine whether the request covers the detection of external sensitive data at the site of the requesting organization. If so, the fingerprint distributor 202 sends the fingerprints of the other organizations to the DLP system of the requestor.

The report generator 204 is responsible for receiving, from DLP systems of various organizations, information on detection of external sensitive data at the sites of these organizations. Each detection incident specifies a customer ID of an organization whose sensitive data has been detected at the site of another organization. Based on the customer ID, the report generator 204 creates a report for each organization and sends it to the relevant organization.

The use of customer IDs allows the DLP service provider 200 to link detection incidents to organizations whose sensitive data is being leaked, without revealing the identity of the organization, thus providing additional protection against group force attacks directed to the fingerprints of the organization.

Figure 3:
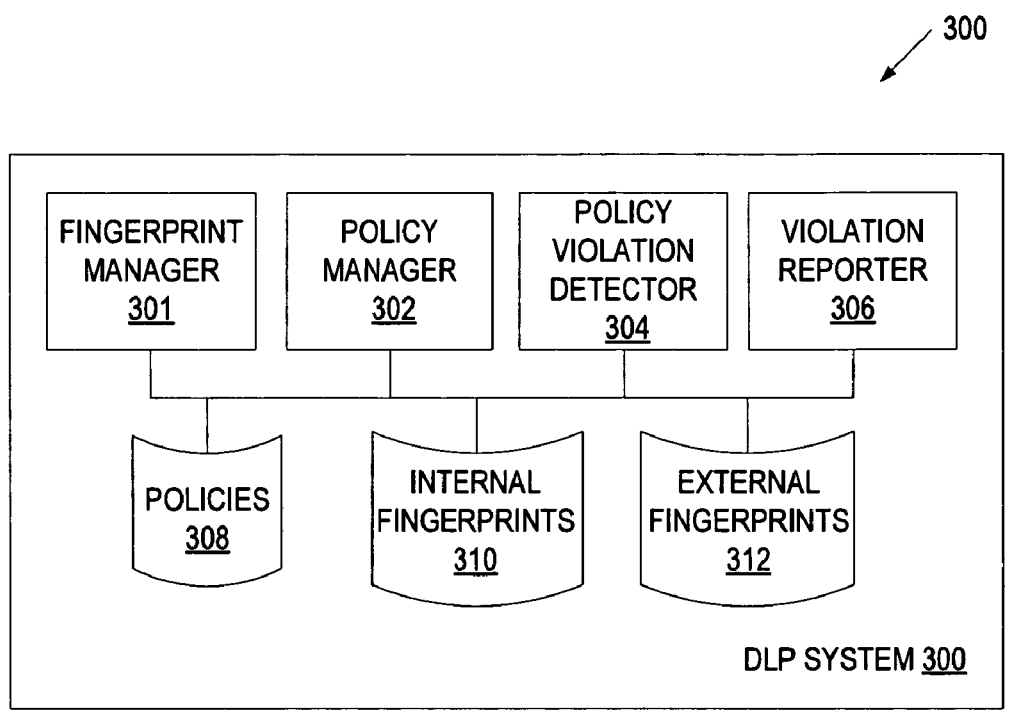
FIG. 3 is a block diagram of one embodiment of a DLP system of an organization.

FIG. 3 is a block diagram of one embodiment of a DLP system 300. The DLP system 300 may include a fingerprint manager 301, a policy manager 302, a policy violation detector 304, a violation reporter 306, a policy data store 308, an internal fingerprint data store 310, and an external fingerprint 312.

The fingerprint manager 301 creates fingerprints of sensitive data within an organization that should be protected ("source data") and stores them in the internal fingerprint data store 310. In addition, the fingerprint manager 301 receives fingerprints of external sensitive data and stores them in the external fingerprint data store 312. In one embodiment, the external fingerprints are stored in association with a corresponding customer ID.

The policy manager 302 defines DLP policies and stores them in the policy store 308. A policy may specify source data that should be protected from unauthorized transmission, access or any other use, and may also specify which portions of the source data should be included in information content to trigger a policy violation.

The policy manager 302 may create DLP policies based on user input. Alternatively, the policy manager 302 may receive DLP policies (e.g., DLP policies with respect to external sensitive data) from the DLP service provider 102 and store them in the policy store 308.

The policy violation detector 304 scans information content (e.g., content stored in databases, caches, etc, and content of transmitted messages) using internal fingerprints and external fingerprints. Upon detecting a match, the policy violation detector 304 determines whether this match violates a DLP policy. If so, the policy violation detector 304 invokes the violation reporter 306 that performs a predetermined action such as reporting the violation, blocking the transfer of the information content, etc.

If the policy being violated concerns external sensitive data, the violation reporter 306 notifies a system administrator or some other user about the policy violation incident, and sends information on the policy violation incident to the DLP service provider 102. The information sent to the DLP service provider may identify, for example, the DLP policy being violated, the customer ID associated with the detected sensitive data, the detected sensitive data, one or more parties that caused the violation, etc.

Figure 4:
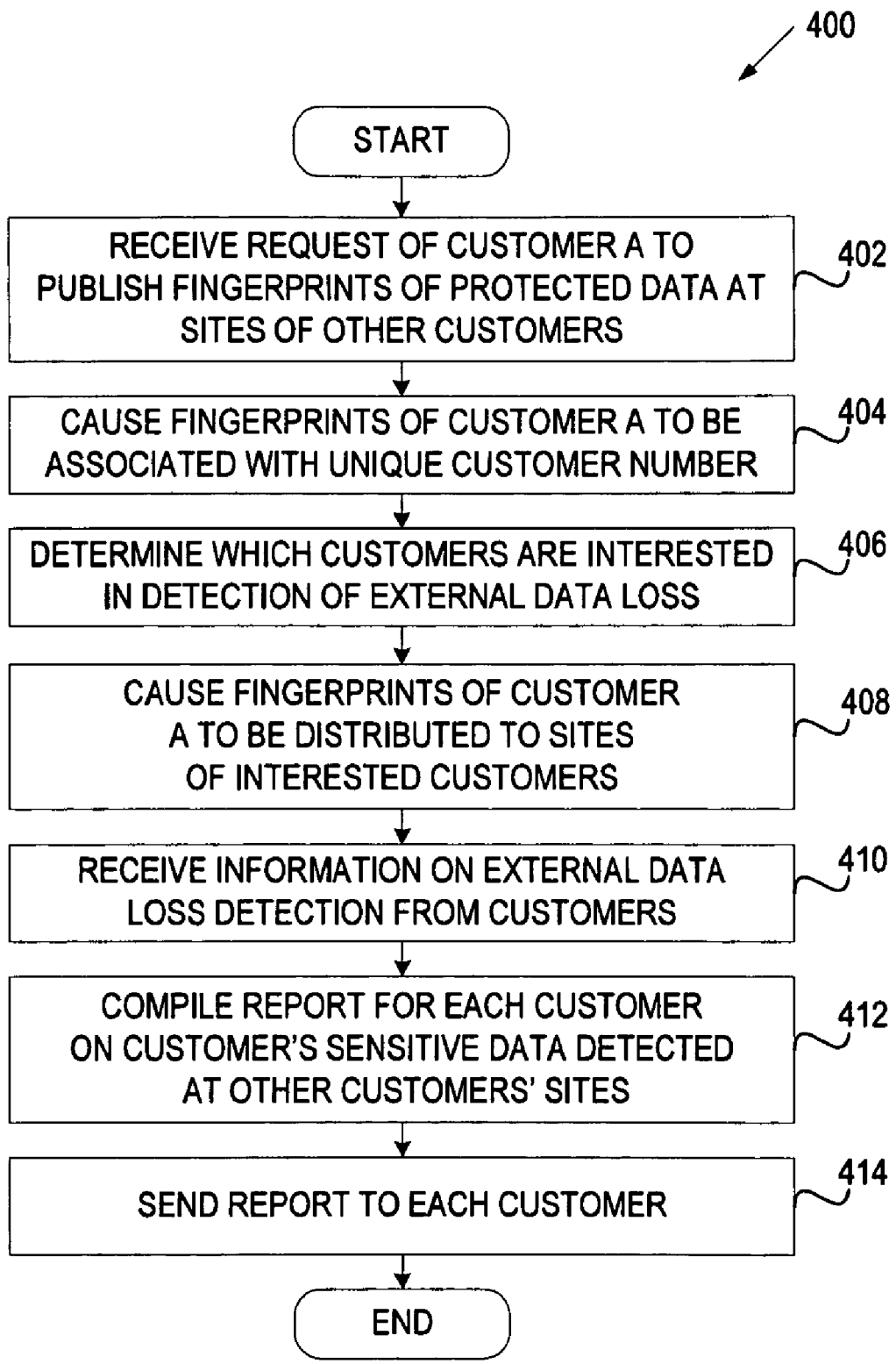
FIG. 4 is a flow diagram of one embodiment of a method for improving DLP via cross leveraging fingerprints.

FIG. 4 is a flow diagram of one embodiment of a method for improving DLP via cross leveraging fingerprints. The method 400 is performed by processing logic that may comprise hardware (circuitry, dedicated logic, etc.), software (such as is run on a general purpose computer system or a dedicated machine), or a combination of both.

In one embodiment, the method 400 is performed by the DLP service provider 102 or 200.

Referring to FIG. 4, processing logic begins with receiving request from a DLP system of customer A to publish fingerprints of its sensitive data (also referred as protected data) at the sites of other customers (block 402). In response, in one embodiment, processing logic obtains the fingerprints from the DLP system of customer A, and associates the fingerprints with the ID of customer A (block 404). In another embodiment, processing logic sends the ID of customer A to the DLP system of customer A and instructs the DLP system of customer A to associate the fingerprints of customer A with this ID.

At block 406, processing logic determines which other customers are interested in fingerprint sharing. Next, in one embodiment, processing logic sends the fingerprints of customer A to DLP systems of the other customers (block 408), and sends the fingerprints of the other customers to the DLP system of customer A. In another embodiment, processing logic instructs the DLP system of customer A to send the fingerprints of customer A to the DLP systems of the other customers, and instructs the DLP systems of the other customers to send their fingerprints to the DLP system of customer A.

In addition, in one embodiment, processing logic also distributes DLP policies pertaining to fingerprints of customer A to the DLP systems of the other customers, and/or DLP policies pertaining to fingerprints of the other customers to the DLP system of customer A. Alternatively, the DLP policies are not shared but are rather defined by the DLP systems receiving the fingerprints of external sensitive data.

At block 410, processing logic receives information on the detection of external sensitive data from DLP systems of various customers. The received information may identify the DLP policy being violated, the customer ID associated with the detected sensitive data, the detected sensitive data, one or more parties that caused the violation, etc.

At block 412, processing logic compiles a report, for each customer ID, based on this customer's sensitive data detected at the other customers' sites. At block 414, processing logic determines the identity of the customer based on the customer ID, determines which users should receive the report, and sends the report to these users.

Figure 5:
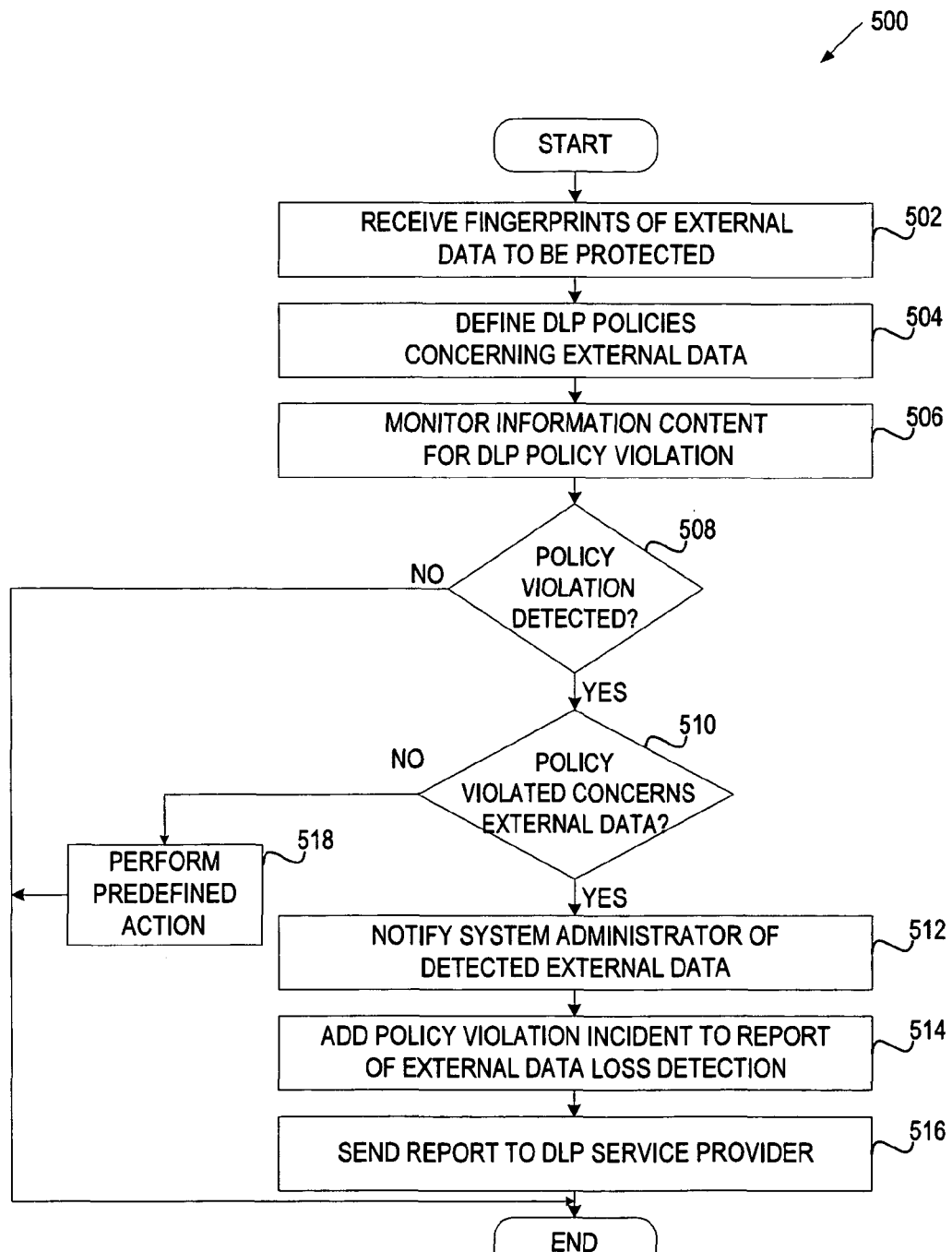
FIG. 5 is a flow diagram of one embodiment of a method for detecting sensitive data in information content of an organization.

FIG. 5 is a flow diagram of one embodiment of a method for detecting sensitive data in information content of an organization. The method 500 is performed by processing logic that may comprise hardware (circuitry, dedicated logic, etc.), software (such as is run on a general purpose computer system or a dedicated machine), or a combination of both. In one embodiment, the method 500 is performed by the DLP system 106 or 300.

Referring to FIG. 5, processing logic begins with receiving fingerprints of external data to be protected (block 502). At block 504, processing logic defines DLP policies concerning the external data. In one embodiment, these DLP policies are created based on user input. Alternatively, these DLP policies are received from the DLP service provider or from the DLP systems of other organizations.

At block 506, processing logic monitors information content to detect DLP policy violations. If no violation is detected, method 500 ends. If a policy violation is detected, processing logic determines whether the violation concerns external sensitive data (block 510). If not, processing logic performs a predefined action for handling detection of internal sensitive data (e.g., preventing transfer of the information content, notifying a supervisor of a user who caused the detected violation, etc.). If so, processing logic informs the system administrator or some other designated user of this policy violation incident that was caused by external sensitive data (block 512). In addition, processing logic adds this policy violation incident to a report of external data detection (block 514) and sends the report to the DLP service provider (block 516).

Figure 6:
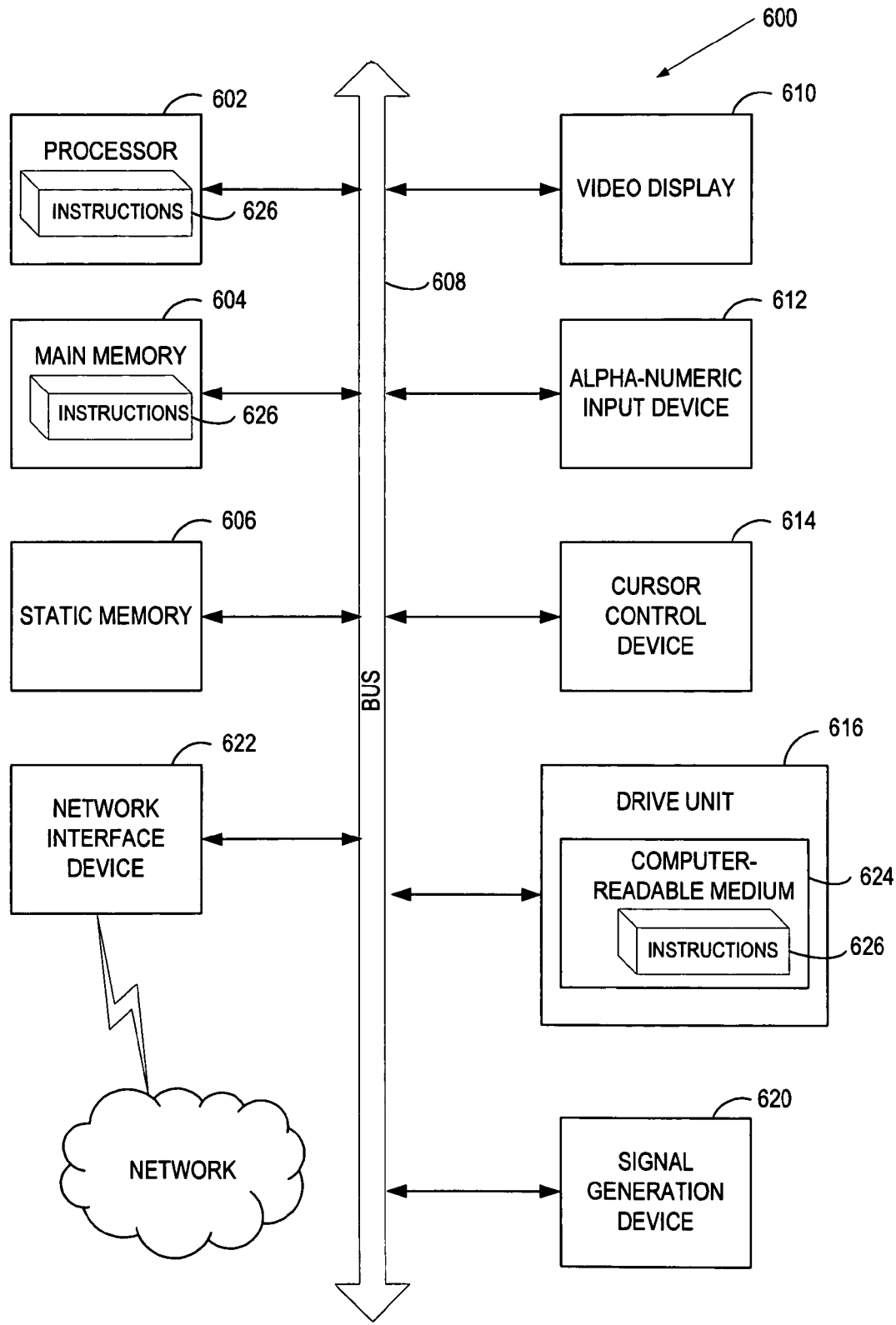
FIG. 6 illustrates a diagrammatic representation of a machine in the exemplary form of a computer system.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing device (processor) 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 616, which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute the processing logic 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable storage medium 624 on which is stored one or more sets of instructions (e.g., software 626) embodying any one or more of the methodologies or functions described herein. The software 626 may also reside, completely or at least partially, within the main memory 604 and/or within the processor 602 during execution thereof by the computer system 600, the main memory 604 and the processor 602 also constituting computer-readable storage media. The software 626 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

I claim:

1. A computer-implemented method, comprising:
   obtaining, by a data loss protection (DLP) service provider, fingerprints of confidential source data of a plurality of organizations;
   distributing, by the DLP service provider, DLP policies defined by the plurality of organizations across DLP systems of the plurality of organizations, the DLP policies specifying conditions to trigger a violation based on regulations concerning handling of sensitive data maintained by the plurality of organizations;
   sharing, by the DLP service provider, the fingerprints of the confidential source data of the plurality of organizations across DLP systems of the plurality of organizations, the plurality of fingerprints being associated with an identifier of a corresponding organization of the plurality of organizations that provided the fingerprints to the DLP service provider, the identifier not revealing an identity of the corresponding organization;
   causing, by the DLP service provider, a DLP system of each of the plurality of organizations to monitor information content to detect policy violations of the plurality of organizations based on the DLP policies of the plurality of organizations using the shared fingerprints;
   causing one or more users within a first organization of the plurality of organizations to be notified about a detection of a policy violation of a DLP policy of a second organization of the plurality of organizations in information content of the first organization without revealing an identity of the second organization;

receiving, by the DLP service provider, information on the detection of the DLP policy violation of the second organization from a DLP system of the first organization, the information including an identifier of the second organization;

identifying, by the DLP service provider, the second organization based on the identifier included in the received information; and notifying, by the DLP service provider, one or more users within the second organization about the detection of the policy violation of a DLP policy of the second organization in the information content.

2. The method of claim 1, wherein the confidential source data of the plurality of organizations comprises at least one of personal information pertaining to employees of a corresponding organization, personal information pertaining to customers of the corresponding organization, information pertaining to business processes of the corresponding organization, and information pertaining to confidential intellectual property of the corresponding organization.

3. The method of claim 1, wherein sharing fingerprints of confidential source data of the plurality of organizations comprises:

receiving requests from the plurality of organizations to share fingerprints of the corresponding organization with the plurality of organizations; and sending the fingerprints of the corresponding organization with the associated identifier to a DLP system of the plurality of organizations.

4. The method of claim 3, wherein notifying one or more users within the second organization about the detection of the policy violation of a DLP policy of the second organization in the information content comprises:

creating a report for each identifier, the report including detected incidents associated with the identifier;

determining one or more recipients of the report based on the identifier; and sending the report to the recipients.

5. The method of claim 4 wherein the report identifies, for each detected incident, data that caused a policy violation.

6. The method of claim 1, further comprising:

enabling sharing of the fingerprints across the plurality of organizations when a number of the plurality of organizations exceeds a threshold.

7. The method of claim 1, wherein a DLP system of the first organization creates one or more policies for detecting confidential source data of the second organization in information content of the first organization, the one or more policies being created based on input provided by a user of the first organization.

8. The method of claim 1, wherein a DLP system of the first organization is operable to monitor information content, detect in the information policy confidential source data violating one or more DLP policies, determine that the detected confidential source data is external, notify a user within the first organization about a detection of the external confidential source data, and send a report identifying external data violating of the DLP policies.

9. A system comprising:

a processor;

a memory coupled to the processor;

a fingerprint distributor executed from the memory by the processor to obtain fingerprints of confidential source data of a plurality of organizations to distribute data loss prevention (DLP) policies defined by the plurality of organizations across DLP systems of the plurality of organizations, the DLP policies specifying conditions to trigger a violation based on regulations concerning handling of sensitive data maintained by the plurality of organizations, to share the fingerprints of the confidential source data of the plurality of organizations across DLP systems of the plurality of organizations, the plurality of fingerprints being associated with an identifier of a corresponding organization of the plurality of organizations that provided the fingerprints to the DLP service provider, the identifier not revealing an identity of the corresponding organization, to cause a DLP system of each of the plurality of organizations to monitor information content to detect policy violations of the plurality of organizations based on the DLP policies of the plurality of organizations using the shared fingerprints, and to cause one or more users within a first organization of the plurality of organizations to be notified about a detection of a policy violation of a DLP policy of a second organization of the plurality of organizations in information content of the first organization without revealing an identity of the second organization; and a report generator, coupled to the fingerprint distributor, executed from the memory by the processor to receive information on the detection of the DLP policy violation of the second organization from a DLP system of the first organization, the information including an identifier of the second organization, to identify the second organization based on the identifier included in the received information, and to notify one or more users within the second organization about the detection of the policy violation of a DLP policy of the second organization in the information content.

10. The system of claim 9, wherein the confidential source data of the plurality of organizations comprises at least one of personal information pertaining to employees of a corresponding organization, personal information pertaining to customers of the corresponding organization, information pertaining to business processes of the corresponding organization, and information pertaining to confidential intellectual property of the corresponding organization.

11. The system of claim 9, wherein the fingerprint distributor is to share fingerprints of confidential source data of the plurality of organizations by:

receiving requests from the plurality of organizations to share fingerprints of the corresponding organization the plurality of other organizations; and sending the fingerprints of the corresponding organization with the associated customer identifier to a DLP system of the the plurality of organizations.

12. The system of claim 11, wherein the report generator is to notify one or more users within the second organization about the detection of the policy violation of a DLP policy of the second organization in the information content by:

creating a report for each identifier, the report including detected incidents associated with the identifier;

determining one or more recipients of the report based on the identifier; and sending the report to the recipients.

13. The system of claim 12 wherein the report identifies, for each detected incident, data that caused a policy violation.

14. The system of claim 9, further comprising a DLP system of the first organization to monitor information content, to detect in the information policy confidential source data violating one or more DLP policies, to determine that the detected confidential source data is external, to notify a user within the first organization about a detection of the external confidential source data, and to send a report identifying external data violating of the DLP policies.

15. A non-transitory computer readable storage medium that provides instructions, which when executed on a processing system, cause the processing system to perform a method comprising:

obtaining, by the processing system, fingerprints of confidential source data of a plurality of organizations;

distributing, by the processing system, DLP policies defined by the plurality of organizations across DLP systems of the plurality of organizations, the DLP policies specifying conditions to trigger a violation based on regulations concerning handling of sensitive data maintained by the plurality of organizations;

sharing fingerprints of the confidential source data of the plurality of organizations across data loss prevention (DLP) systems of the plurality of organizations, the plurality of fingerprints being associated with an identifier of a corresponding organization of the plurality of organizations that provided the fingerprints to the DLP service provider, the identifier not revealing an identity of the corresponding organization;

causing a DLP system of each of the plurality of organizations to monitor information content to detect policy violations of the plurality of organizations based on the DLP policies of the plurality of organizations using the shared fingerprints;

causing one or more users within a first organization of the plurality of organizations to be notified about a detection of a policy violation of a DLP policy of a second organization of the plurality of organizations in information content of the first organization without revealing an identity of the second organization;

receiving information on the detection of the DLP policy violation of the second organization from a DLP system of the first organization, the information including an identifier of the second organization;

identifying the second organization based on the identifier included in the received information; and notifying one or more users within the second organization about the detection of the policy violation of a DLP policy of the second organization in the information content.

16. The non-transitory computer readable storage medium of claim 15, wherein the confidential source data of the plurality of organizations comprises at least one of personal information pertaining to employees of a corresponding organization, personal information pertaining to customers of the corresponding organization, information pertaining to business processes of the corresponding organization, and information pertaining to confidential intellectual property of the corresponding organization.

17. The non-transitory computer readable storage medium of claim 15, wherein sharing fingerprints of confidential source data of the plurality of organizations comprises:

receiving requests from the plurality of organizations to share fingerprints of the corresponding organization with the plurality of organizations; and sending the fingerprints of the corresponding organization with the associated identifier to a DLP system of the the plurality of organizations.

18. The non-transitory computer readable storage medium of claim 17, wherein notifying one or more users within the second organization about the detection of the policy violation of a DLP policy of the second organization in the information content comprises:

creating a report for each customer identifier, the report including detected incidents associated with the identifier;

determining one or more recipients of the report based on the identifier; and sending the report to the recipients.

* * * * *